July 25, 1961  B. T. GILDERSLEEVE  2,993,626
LIQUID DISPENSER FOR SEED PLANTERS
Filed May 16, 1958  2 Sheets-Sheet 1
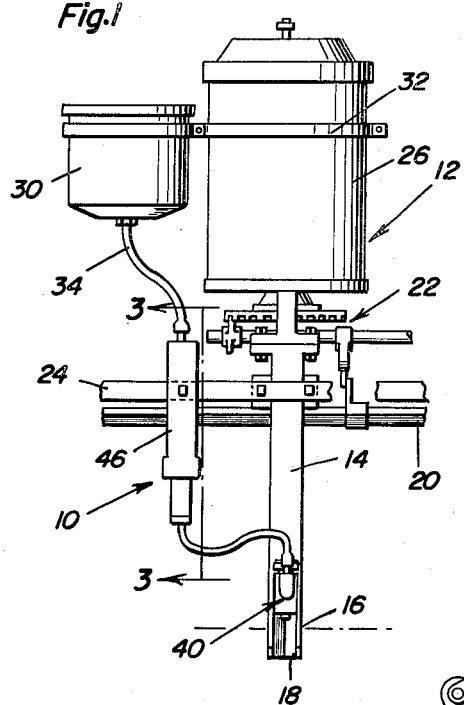
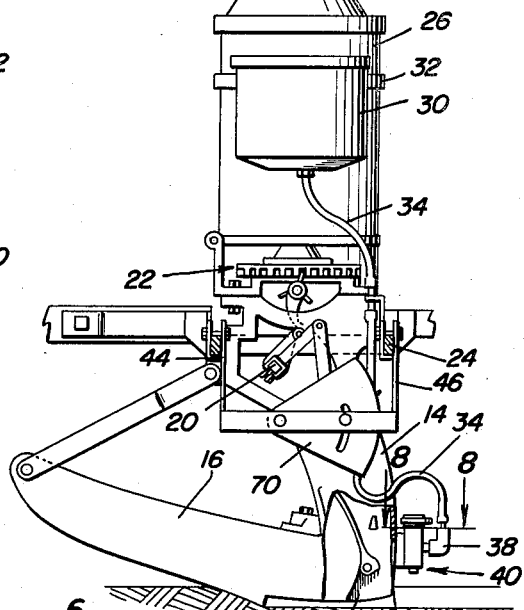
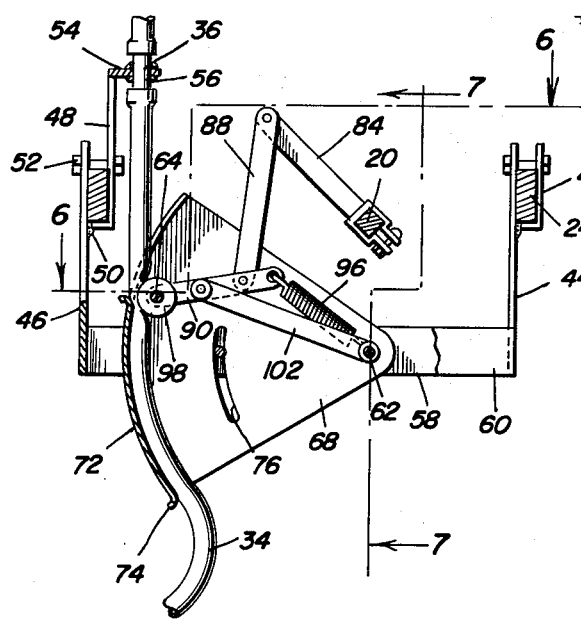
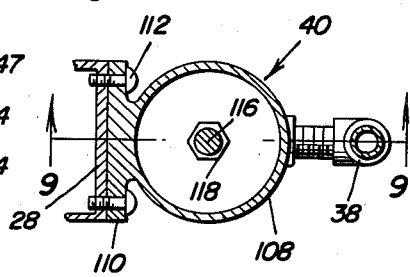
Benjamin T. Gildersleeve
INVENTOR.

July 25, 1961  B. T. GILDERSLEEVE  2,993,626
LIQUID DISPENSER FOR SEED PLANTERS
Filed May 16, 1958  2 Sheets-Sheet 2
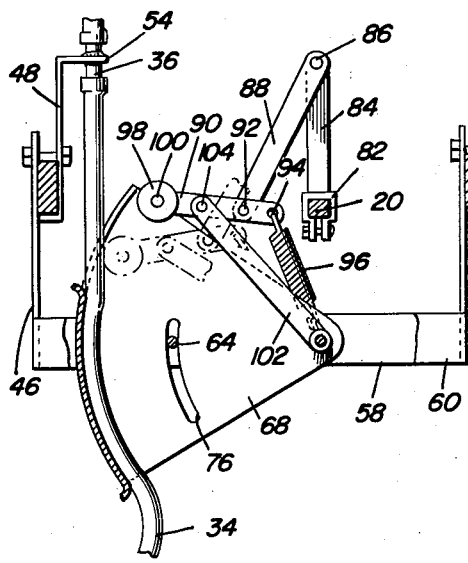
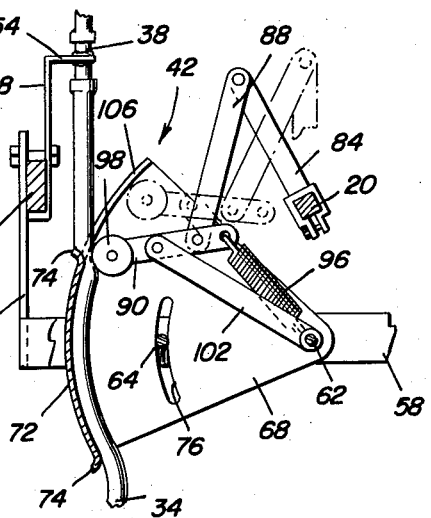
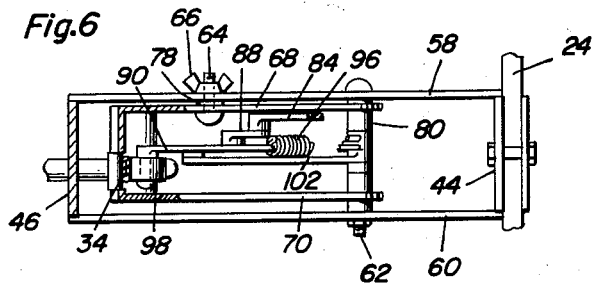
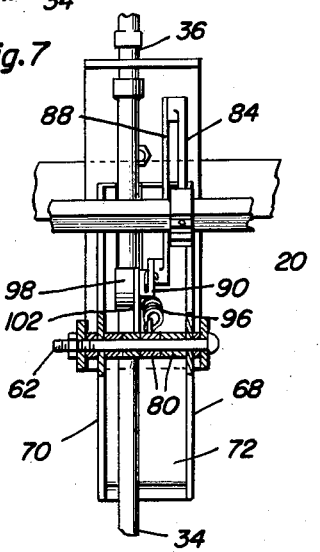
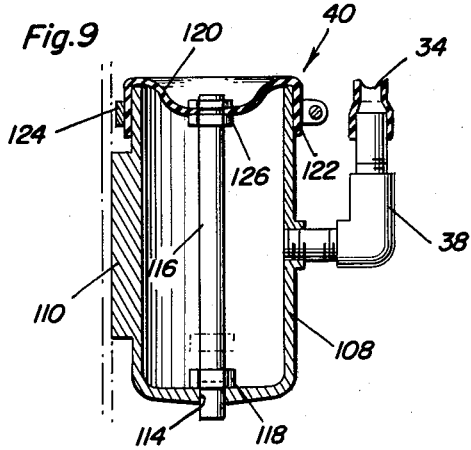
Benjamin T. Gildersleeve
INVENTOR.

United States Patent Office 2,993,626
Patented July 25, 1961

2,993,626
LIQUID DISPENSER FOR SEED PLANTERS
Benjamin T. Gildersleeve, Hudson, Ill.
Filed May 16, 1958, Ser. No. 735,863
4 Claims. (Cl. 222—214)

The present invention generally relates to a liquid dispenser and more particularly to a dispenser which is attached to a seed planter for dispensing liquid materials under pressure into or onto the soil concurrent with the dropping of seeds by a seed planter with the planter effecting the dropping of the seed in hills in which a hill consists of one or more seeds in a pocket of soil.

An object of the present invention is to provide a pressure tight liquid dispenser for dispensing liquid under pressure when connected to the mechanism of a seed planter which actuates the dropping of the seed to the soil in hills thereby providing a highly effective structure for dispensing certain materials such as liquid fertilizers, insecticides, weedicides, or other chemicals in liquid form by locating and concentrating the liquid material which is dispensed within the immediate area or adjacent area into which the seeds are dropped thus effecting less waste of material and more accurate placement of the material for more effective use thereof.

Another object of the present invention is to provide a liquid dispenser in accordance with the preceding object in which the quantity of liquid dispensed per hill may be easily controlled by adjustable features and also adjustable features provided for varying the placement of the liquid in relation to the seeds when they are deposited in or on the soil.

Further objects of the present invention will reside in its simplicity of construction, ease of operation, ease of attachment, accuracy of dispensing and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial rear elevation of a seed planter illustrating the liquid dispenser of the present invention attached thereto in an exemplary manner although the particular structure for attachment and the particular association of the planter construction may vary depending upon the particular type of planter the present device is used with;

FIGURE 2 is a side elevation of the construction of FIGURE 1;

FIGURE 3 is a detailed sectional view taken substantially upon a plane passing along section line 3—3 of FIGURE 1 illustrating further structural details of the liquid dispenser;

FIGURE 4 is a sectional view similar to FIGURE 3 illustrating the dispensing mechanism in another position;

FIGURE 5 is a view similar to FIGURE 4 illustrating the dispensing roller in engagement with the flexible tube;

FIGURE 6 is a plan sectional view taken substantially upon a plane passing along section line 6—6 of FIGURE 3;

FIGURE 7 is a sectional view taken substantially upon a plane passing along section line 7—7 of FIGURE 3;

FIGURE 8 is a sectional view taken substantially upon a plane passing along section line 8—8 of FIGURE 2 illustrating the mounting construction for the diaphragm valve operated in response to pressure; and FIGURE 9 is a sectional view taken substantially upon a plane passing along section line 9—9 of FIGURE 8 illustrating further structural details of the diaphragm valve.

Referring now more specifically to the drawings, the numeral 10 generally designates the liquid dispenser of the present invention which is illustrated as being attached to a conventional seed planter generally designated by the numeral 12 of the type which dispenses seed downwardly through a tubular chute 14 into a longitudinally elongated shoe 16 having a hollow rear portion 18 for dispensing seeds. A transverse operating shaft 20 of polygonal construction drives the seed dispensing mechanism generally designated by the numeral 22 with the seed dispensing or valving mechanism 22 forming no part of the present invention and with only the planter shaft 20 being employed for actuating the liquid dispenser 10 of the present invention. The planter shaft 20 in its normal operation will rotate approximately one-quarter of a turn each time the seed is dropped and will then snap back to its original position and the liquid dispenser of the present invention is operated from the shaft 20 so that the discharge of the liquid fertilizer is responsive to the planter shaft 20 which also controls the point of discharge of the seeds thereby providing an arrangement in which the discharge of the liquid material may be varied so that it will discharge immediately adjacent the seeds or actually onto the seeds or in any longitudinal relation to the seed hills as desired. For purposes of attaching the liquid dispenser, the seed planter 12 is provided with a pair of transversely extending support or frame bars or rails 24 and a seed box 26 and the depending chute 14 is provided with a rear wall 28 and this structure is employed for supporting the liquid dispenser although the supporting mechanism may vary depending upon the particular construction of the planter for adapting the liquid dispenser for use with various types of seed planters.

The liquid dispenser 10 includes liquid source in the form of an enlarged liquid receptacle 30 of any convenient size and shape which is supported alongside or adjacent to the seed box 26 by a double clamp ring 32. Extending downwardly from the vented receptacle 30 is a flexible tube 34. The flexible tube 34 is provided with a tubular pipe insert 36 which may be of rigid construction and then continues as a flexible conduit down to an L-shape fitting 38 which communicates with a discharge valve generally designated by the numeral 40 with the lower section of the flexible tube 34 extending through a pressure mechanism generally designated by the numeral 42.

A pair of vertical brackets 44 and 46 extend alongside the rear surfaces of the frame rails 24 and adjacent the upper end of each bracket 44 and 46 there is provided an L-shaped bracket 47 and 48 respectively with the short leg of the brackets 47 and 48 being secured to the vertical brackets 44 and 46 as by welding 50 and the vertical legs thereof secured by fastening bolts 52 thus rigidly supporting the brackets 44 and 46 from the frame rails 24. The L-shaped bracket 48 extends above the upper end of the vertical bracket 46 and terminates in a laterally extending support member 54 which has an opening in encircling relation to the rigid pipe insert 36 and which is welded thereto as indicated by the numeral 56 thus permanently attaching the pipe 36 and preventing longitudinal movement of the lower section of the flexible tube 34 with it noted that the tube 34 is removably attached to the pipe 36.

Interconnecting the lower side edges of the brackets 44 and 46 is a pair of plates 58 and 60 having a pair of longitudinally spaced bolts 62 and 64 extending therethrough with the bolt 64 having a wing nut 66 thereon for ease of manipulation thereof. The bolt 64 extends through only one plate such as 58.

Pivotally mounted on the bolt 62 is a pair of pie-shaped plates 68 and 70 having arcuate outer edges which are partially interconnected by an arcuate abutment wall 72 having outwardly flared upper and lower ends 74 with the lower section of the flexible tube 34 being supported against the inner surface of the wall 72. One of the plates 68 has an arcuate closed end slot 76 therein through which the bolt 64 passes. A cylindrical spacer 78 is placed on the bolt 64 so that when the wing nut 66 is loosened and tightened, the U-shaped yoke defined by the plates 68 and 70 as well as the end wall 72 may be locked in angularly adjusted position about an axis defined by the bolt 62. Tubular spacers 80 are also provided on the bolt 62 to prevent lateral movement of the plates 68 and 70 with the spacers 80 also being for other purposes described hereinafter.

Mounted rigid with the planter shaft 20 is a bracket 82 having an operating arm 84 rigid therewith. Pivotally connected to the outer end of the arm 84 by pivot pin 86 is a connecting link 88 which in turn has a roller lever arm 90 pivotally connected to the outer and lower end thereof by pivot pin 92 which is located intermediate the ends of the roller lever arm 90 but adjacent to one end thereof. The adjacent end of the roller lever arm 90 is provided with an opening 94 having one end of a tension spring 96 connected thereto. The other end of the tension spring 96 is connected to one of the spacers 80. The other end of the roller lever arm 90 is provided with a roller 98 journaled on an axle or pin 100.

Also mounted on one of the spacers 80 on the bolt 82 is a fulcrum lever 102 that is pivotally connected to the roller lever arm 90 by a pivot pin 104 which is located intermediate the pivot pin 92 and the roller 98. As clearly shown in FIGURE 6, the roller 98 is in alignment with the lower section of the flexible tube 34 which rests on the end wall 72 and is received in the notch 106 formed in the upper portion of the end wall by omission of a part thereof with the lower end of the notch 104 being flared outwardly forming the outward flare 74 with this structure clearly being illustrated in FIGURES 4–6.

Now referring to FIGURES 8 and 9, the discharge valve includes a tubular or hollow body 108 communicated with the fitting 38 by suitable pipe couplings and including a bracket 110 on one side thereof for receiving fasteners 112 mounting the bracket on the rear wall 28 of the seed chute 14. The bottom of the tubular valve body 108 is provided with a discharge opening 114 with a movable valve stem 116 slidably disposed therein with the stem 116 having an abutment 118 thereon which limits movement of the stem 116 in the opening 114 and forms a closure therefor when the abutment 118 engages the inner surface of the bottom of the housing 108. Extending across the top of the housing 108 is a flexible diaphragm 120 having the peripheral edge thereof downturned as indicated by the numeral 122 and rigidly secured to the casing 108 in sealed relation by a split clamp ring 124. The upper end of the stem 116 extends through the center of the diaphragm 120 and is held thereon in sealed relation by clamp nuts 126.

The operation of the device involves the movement of the roller 98 over the flexible tube 34 a predetermined amount with the tubular member being backed up by the wall 72. Since the wall 72 is adjustable, this regulates the amount of hose that is backed up and thus the amount of the hose 34 which is compressed by the roller. As the roller moves over the hose and the hose is flattened or compressed, liquid material is moved ahead of the roller. The movement of the roller over the tube or hose is of a reciprocating action due to the oscillation of the planter shaft. The roller pushes against the hose on the power or down stroke and then moves slightly away from the hose as it is snapped back to its starting position by the planter shaft. This allows the hose to be fully recharged with liquid material by gravity flow from its supply container each time the roller is snapped back to its starting position. The discharge valve or pressure valve assures that liquid will not flow continuously and will flow only on the power stroke and acts as a checking unit which stops the flow from its discharge opening except when the roller is passing over the tube or hose on the power stroke. The seating of the abutment 118 and positioning of the pin 116 in the opening 114 prevents flow of liquid from the casing 108 under normal or ordinary pressure. When the roller is passed over the hose on the power stroke additional liquid moves into the container and since the container is continuously full of liquid when the roller is away from the hose, the additional liquid forced into the housing or container will extend the diaphragm upwardly and outwardly thus causing the pin to be pulled from the hole thus opening the hole in the container and causing the liquid to be dispensed and as the roller snaps back to its original position, the pressure within the system is reduced and the diaphragm retracts thus pushing the pin back to its seated position and closing the hole and the discharge of liquid ceases.

The movement of the roller towards and away from the hose during the power and retraction stroke is caused by the relationship of the arm 84, link 88, roller lever arm 90 and fulcum lever 102 with the spring 96 serving to retract and retain the roller 98 normally away from the hose except when forced into contact with the hose by the rotation of the planter shaft 20.

By adjustment of the yoke or quadrant formed by the plates 68, 70 and 62, the quantity of liquid dispensed for each stroke may be varied by varying the length of hose backed up by the wall 72 during movement of the roller thereover. By varying the relationship of the operating mechanism for the roller, the point of discharge of the liquid material may be determined thus discharging the material directly onto the seed or immediately adjacent thereto in any relationship desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a liquid dispenser and a seed planter, said seed planter having an oscillatable planter shaft, said liquid dispenser comprising a flexible tube, the adit end of said tube being in communication with a liquid source, a discharge check valve at the exit end of said tube for controlling the discharge of fluid therefrom, said exit end being disposed adjacent the point of dropping of the seeds from said planter, a pressure mechanism engaging a portion of said flexible tube for intermittently urging a quantity of liquid therethrough, said pressure mechanism including an abutment wall disposed adjacent said portion of said tube and contacting one side thereof, a roller, means for effecting one way movement of said roller toward said check valve in pressure engagement with and along the opposite side of said portion of said flexible tubing for compressing the latter between said roller and said abutment wall thereby forcing the liquid in said portion of said tube toward said check valve, said movement means being operatively connected to said oscillatable planter shaft whereby liquid will be discharged adjacent the point of each seed dropping in timed relation thereto, and means adjustably positioning said abutment wall in adjusted positions toward said check valve whereby a lesser portion of said tube will be compressed during the movement of said roller towards said check valve thereby reducing the amount of liquid discharged therefrom.

2. The combination of claim 1, said discharge valve including a hollow casing having an opening in the bottom thereof and a movable pin for selectively opening and closing said opening, a diaphragm connected with the upper end of the pin and normally holding the pin in closed position, said diaphragm being responsive to an increase of pressure in the casing for lifting the pin out of the opening for permitting discharge of liquid material in response to pressure increase.

3. The combination of claim 1 wherein said pressure mechanism includes an offset operating arm having one end fixedly secured to said planter shaft for movement therewith, a link pivotally connected at one end to the other end of said operating arm, a roller lever arm, the other end of said link being pivotally connected to said roller lever arm adjacent one end thereof, said roller being carried by the other end of said roller lever arm adjacent its other end, a fulcrum arm having a stationary pivot at one end and being pivotally secured to said roller lever arm intermediate said link and said roller, said link extending transversely of said roller lever and said fulcrum arm whereby movement of said link will effect movement of said roller both along said flexible tube and toward said abutment wall.

4. A liquid dispenser for use with a seed planter of the type having an oscillatable planter shaft, said dispenser comprising a flexible tube, the adit end of said tube being in communication with a liquid source, a discharge check valve at the exit end of said tube for controlling the discharge of fluid therefrom, said exit end being adapted to be disposed adjacent the point of dropping of the seeds from said planter, a pressure mechanism engaging a portion of said flexible tube for intermittently urging a quantity of liquid therethrough, said pressure mechanism including an abutment wall disposed adjacent said portion of said tube and contacting one side thereof, a roller, means for effecting one way movement of said roller toward said check valve in pressure engagement with and along the opposite side of said portion of said flexible tubing for compressing the latter between said roller and said abutment wall thereby forcing the liquid in said portion of said tube toward said check valve, said movement means being adapted to be operatively connected to said oscillatable planter shaft whereby liquid is adapted to be discharged adjacent the point of each seed dropping in timed relation thereto, said pressure mechanism including an offset operating arm having one end adapted to be fixedly secured to said planter shaft for movement therewith, a link pivotally connected at one end to the other end of said operating arm, a roller lever arm, the other end of said link being pivotally connected to said roller lever arm adjacent one end thereof, said roller being carried by said roller lever arm adjacent its other end, a fulcrum arm having a stationary pivot at one end and being pivotally secured to said roller lever arm intermediate said link and said roller, said link extending transversely of said roller lever and said fulcrum arm whereby movement of said link will effect movement of said roller both along said flexible tube and toward said abutment wall.

References Cited in the file of this patent

UNITED STATES PATENTS

| | | |
|---|---|---|
| 2,113,022 | Hefti | Apr. 5, 1938 |
| 2,554,570 | Harvey | May 29, 1951 |
| 2,643,794 | Perkins | June 30, 1953 |
| 2,695,567 | Harvey | Nov. 30, 1954 |